(12) United States Patent
Schumann et al.

(10) Patent No.: US 6,328,069 B1
(45) Date of Patent: Dec. 11, 2001

(54) OIL PURGING DEVICE

(76) Inventors: Timothy Andrew Schumann, 7958 Southworth Rd., Valley Springs, CA (US) 95252; Daniel L Schumann, 5132 Brookside Ct., Concord, CA (US) 94521

( * ) Notice: Subject to any disclaimer, the term of this patent is extended or adjusted under 35 U.S.C. 154(b) by 0 days.

(21) Appl. No.: 09/658,088

(22) Filed: Sep. 8, 2000

(51) Int. Cl.$^7$ ..................................................... F16K 11/02
(52) U.S. Cl. ............................................. 137/881; 137/540
(58) Field of Search ................................ 137/881, 538, 137/540

(56) References Cited

U.S. PATENT DOCUMENTS

| | | |
|---|---|---|
| 2,068,727 | 1/1937 | Zahodiakin . |
| 2,216,360 | 10/1940 | Sweetland . |
| 2,835,234 * | 5/1958 | Rasch et al. .......................... 137/881 |
| 3,601,154 * | 8/1971 | Demler .................................. 137/881 |
| 3,943,969 * | 3/1976 | Rubin et al. .......................... 137/540 |
| 4,172,738 | 10/1979 | Woltjen . |
| 4,644,972 * | 2/1987 | Perrott .................................. 137/883 |
| 4,869,346 | 9/1989 | Nelson . |
| 5,228,536 | 7/1993 | Mohns . |
| 5,244,007 * | 9/1993 | Glave .................................... 137/212 |

* cited by examiner

Primary Examiner—John Fox
(74) Attorney, Agent, or Firm—Theodore J. Bielen, Jr.

(57) ABSTRACT

A device for purging contaminated oil from a lubrication conduit is provided. The device may be used wherever a contaminated fluid or gas is purged from a conduit circuit. The preferred embodiment includes a housing which may be finned to allow the radiating of heat from engine oil to the environment. The housing includes an inlet and a primary and secondary outlet adapted for serial installation in a conduit. The housing is further provided with primary bore and a secondary bore therethrough so as to allow communication between the inlet and the primary and secondary outlets. The primary bore includes a check valve seat with in the housing. The secondary outlet is fitted with a diverter valve seat and a diverter valve to allow a user to selectively open and close the diverter valve. The check valve allows normal oil flow during engine operation when the diverter valve is shut off but closes when a negative pressure exists at the primary outlet with respect to the secondary outlet.

4 Claims, 5 Drawing Sheets

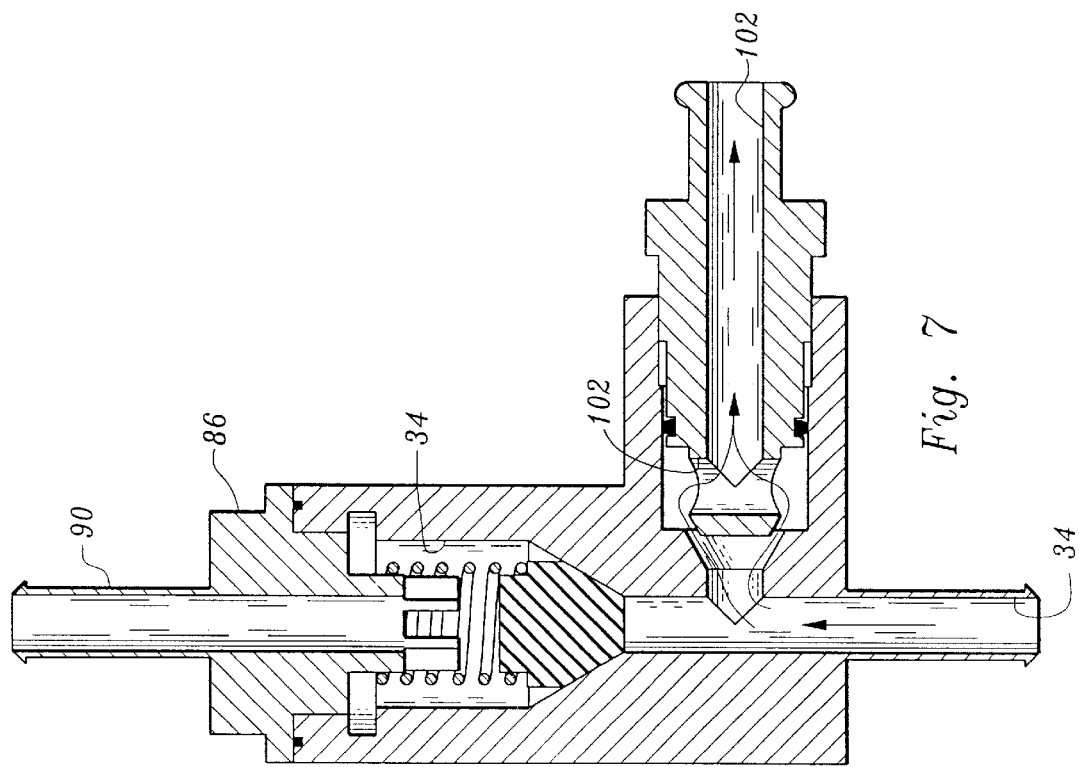
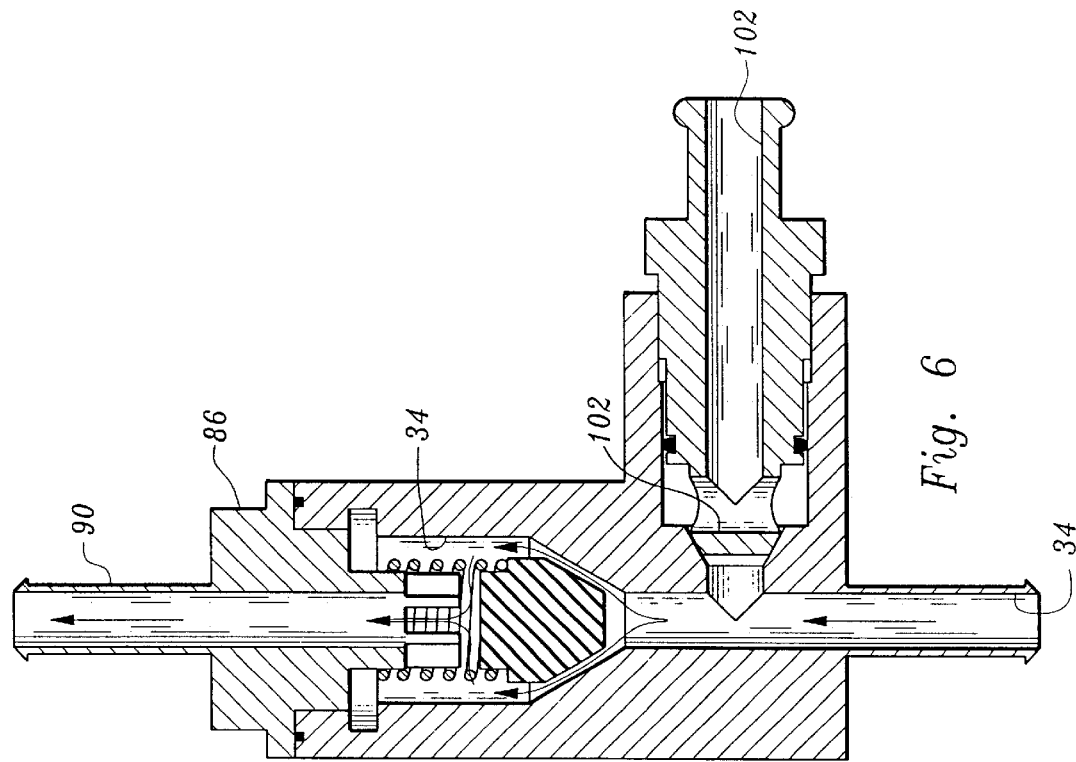

OIL PURGING DEVICE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The instant invention relates generally to the purging of contaminated fluids or gases from fluid and gas transport conduits. More specifically, the instant invention relates to a device that provides a simple and efficient means for purging contaminated fluids in an engine lubrication conduit after contaminated oil has been drained from a crankcase and replaced with fresh oil.

Internal combustion engines generally include an oil pan or tank for holding a reserve of oil for use in lubricating metal surfaces during engine operation. During engine operation, an oil pump typically receives oil from the tank, pressurizing a system of supply lines and journals for delivery of oil to bearing surfaces, valve head assemblies and the like. Such lubrication is necessary not only to minimize friction between moving parts, but also to remove heat from internal engine components during operation.

Because of the critical function lubricating oil performs, it is important the oil remain free of byproducts of combustion and metallic fragments that accumulate during engine operation. For this reason, it is common to find a removable filter that may be replaced or cleaned at various intervals. Further, because of the limited filtration ability of most filters, it is also common to drain contaminated oil from the engine and replace it with fresh oil at the same time the filter is cleaned or replaced.

Engine oil replacement generally involves running the engine to operating temperature so as to heat the contaminated oil to allow it to flow freely. The engine is then stopped and the oil is allowed to collect in the tank or crankcase for a period of time. A drain plug is typically provided on the tank or crankcase, which is removed to allow drainage of the contaminated oil. Thereafter, the drain plug is reinstalled and fresh oil added to the engine in sufficient amounts as dictated by the engine manufacturer.

The aforementioned engine may be comprised of a multiple piston/rod sets, bearings, a crankcase, oil pump, cam sets, rocker arms and inlet and exhaust valves. Accordingly, multiple channels, journals, and other conduits exist to deliver lubricating oil to those moving parts.

The oil replacement method discussed above has the undesirable result of leaving a quantity of contaminated oil in the conduit system and crankcase in that only the oil that collects in the tank is replaced. This allows contaminated oil remaining in the conduits and crankcase to mix with fresh oil, so that lubrication maintenance intervals for the engine are shortened.

This problem is particularly troublesome in certain engine designs, such as those found on certain HARLEY DAVIDSON motorcycles. Because some engine designs include a separate tank for the receiving and draining of oil which is remote from the crankcase, a large quantity of contaminated oil remains in the lubrication conduit system and crankcase after oil replacement, because no drain plug is provided on the crankcase.

Thus, the need has arisen for a device that allows for the purging of contaminated oil from an engine during engine oil removal and replacement. The need has further arisen for a device that will accomplish this task that is simple, inexpensive and requires little or no maintenance.

Accordingly, it is an object of the instant invention to overcome the limitations of lubricating oil replacement presently in use. It is a further object of the instant invention to provide an in-line oil-purging device that allows the convenient and efficient removal of contaminated oil from engine lubrication conduits and crankcase. It is yet a further object of the invention to provide such a device that is simple in operation, inexpensive to construct and requires little or no maintenance.

These, together with other objects of the invention, along with the various features a novelty which characterize the invention, are pointed out with particularity in the claims annexed to and forming a part of this disclosure. For better understanding of the invention, its operating advantages and the specific objects attained by its uses, reference should be made to the accompanying drawings and descriptive matter in which there is illustrated a preferred embodiment of the invention.

BRIEF SUMMARY OF THE INVENTION

The purpose of the present invention, which will be described subsequently in greater detail, is to provide an in-line engine oil purging device for which has many novel features which are not anticipated, rendered obvious, suggested, or even implied by any prior art oil purging device, either alone or in combination thereof.

In accordance with the present invention, a housing is provided for in-line, serial installation in a fluid conduit such as an engine oil transfer line. The preferred embodiment optionally includes a finned housing to allow the efficient radiating of heat from engine oil to the environment. The housing includes an inlet and a primary and secondary outlet. The inlet and primary outlets are adapted for serial installation in a conduit. The housing is further provided with primary bore and a secondary bore therethrough so as to provide fluid communication between the inlet and the primary and secondary outlets. The primary bore is provided so as to include a check valve within the housing.

The secondary outlet is fitted with a diverter valve to allow a user to selectively open and close the diverter valve. In the preferred embodiment, the check valve allows engine oil to flow through the housing during normal engine operation. A spring is provided to urge the check valve against a valve seat when a negative pressure exists at the primary outlet with respect to the secondary outlet.

The diverter valve remains closed during normal engine operation. The diverter valve is opened during the oil change operation immediately after the engine oil is replaced. The engine is started, pressurizing the oil lines. The pressure differential between the primary outlet and the secondary outlet allows the spring to urge the check valve closed against the valve seat, closing the primary outlet. Contaminated oil remaining in the conduit and crankcase is thus forced through the diverter valve by the pressurized fresh oil, where it is collected by the user. When clean oil is observed flowing from the diverter valve, the diverter valve is closed, the engine is shut off and the engine oil is topped off with clean oil.

There has thus been outlined, rather broadly, the more important features of the invention in order that the detailed description thereof which follows may be better understood and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements or uses of the components set forth in the following description or illustrated in the drawings.

The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods and systems for carrying out the several purposes of the present invention.

It is important, therefore, that the claims be regarded as including such equivalent constructions in so far as they do not depart from the spirit and scope of the present invention.

Further, the purpose of the foregoing summary is to enable the U.S. Patent and Trademark Office and the public generally, especially engineers and practitioners in the art who are not familiar with patent or legal terms or phraseology, to determine quickly from a cursory inspection, the nature and essence of the technical disclosure of application.

The summary is neither intended to define the invention of the application, which is measured by the claims, nor is intended to be limiting as to the scope of the invention in any way.

Prior Art

U.S Pat. No. 2.068,727: Zahodiakin
U.S Pat. No. 2,216,360: Sweetland
U.S Pat. No. 4,172,738: Woltjen
U.S Pat. No. 4,869,346: Nelson
U.S Pat. No. 5,228,536: Mohns While these patents were found in a comprehensive search, none discloses any structure or operation as claimed herein.

BRIEF DESCRIPTION OF THE DRAWINGS

The invention is further described in connection with the accompanying drawings in which:

FIG. 6 is a cross-sectional view of a preferred embodiment of the present invention, showing the flow of oil during normal engine operation through the invention when the diverter valve is closed;

FIG. 7 is a cross-sectional view of a preferred embodiment of the present invention showing the flow of oil during normal engine operation through the invention when the diverter valve is open.

DETAILED DESCRIPTION OF THE INVENTION

Figure 1:
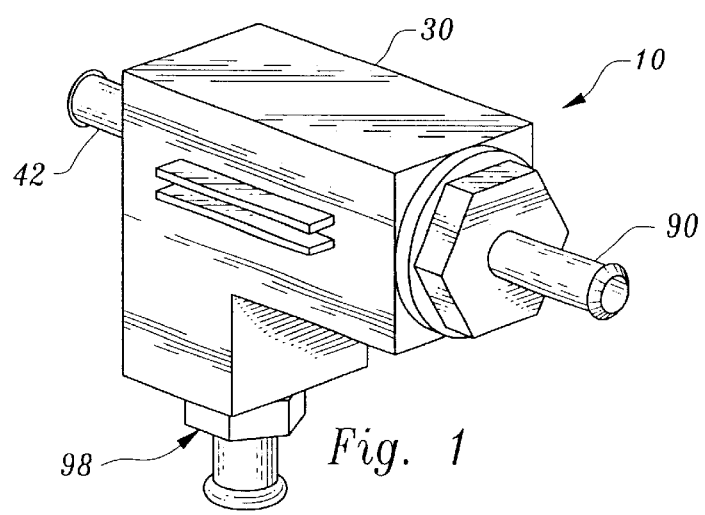
FIG. 1 is a perspective view of a preferred embodiment of the oil purging device, constructed in accordance with the teachings of the present invention.

Referring now to the drawings wherein like reference numerals refer to like elements throughout the several views, FIG. 1 illustrates a preferred embodiment of the oil purging device 10 which is the subject of the present invention.

Figure 2:
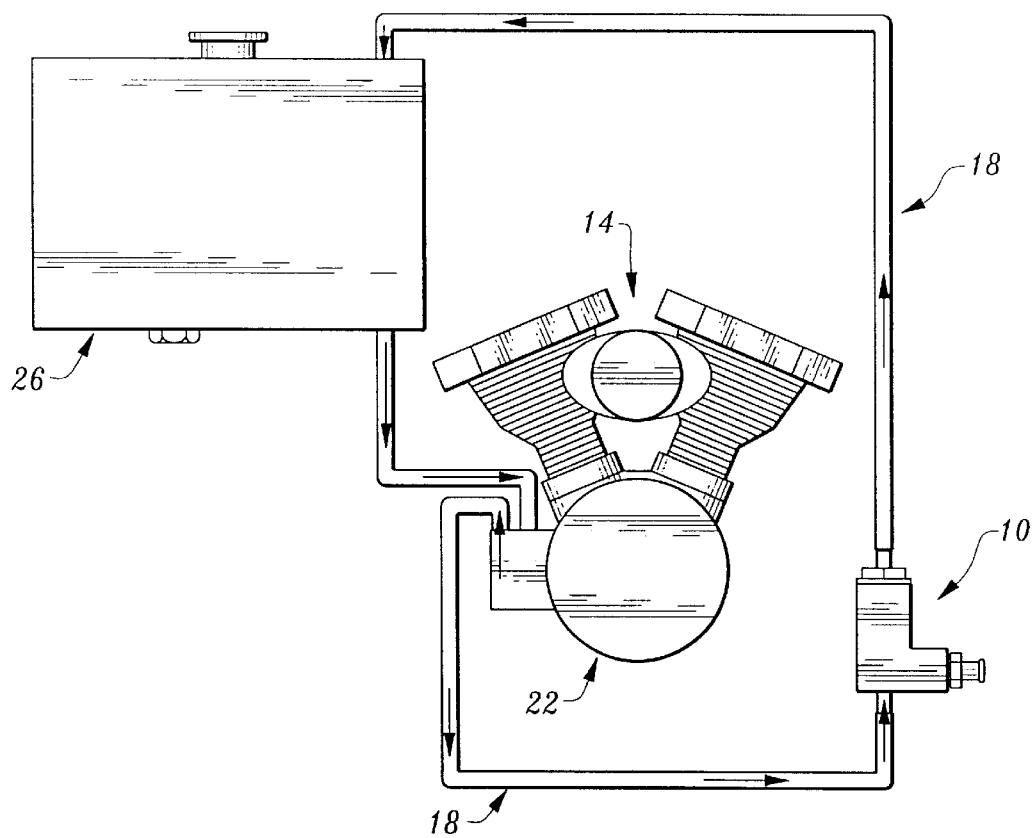
FIG. 2 is an illustration of a motorcycle engine, showing a preferred embodiment of the present invention installed in the lubrication conduit circuit with the diverter valve closed and showing the path of oil during normal engine operation.
Figure 3:
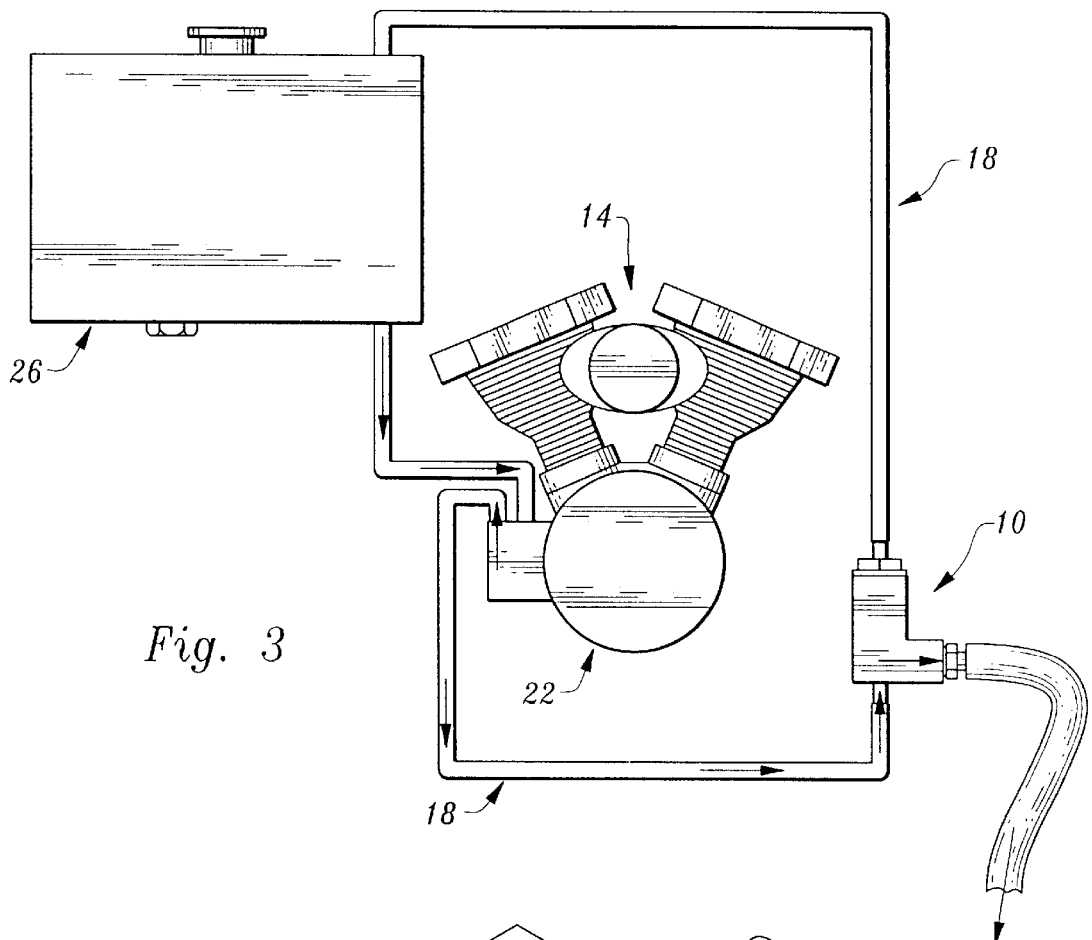
FIG. 3 is an illustration of a motorcycle engine, showing a preferred embodiment of the present invention installed in the lubrication conduit circuit with the diverter valve open and showing the path of oil through the diverter valve.

FIGS. 2 and 3 show oil purging device 10 installed in a motorcycle engine 14. Oil purging device 10 is intended to be permanently installed serially in lubrication conduit 18. downstream from crankcase 22 and feeding into oil tank 26.

As will be discussed more fully below, FIG. 2 shows the path of oil through lubrication conduit 18 during normal engine operation. FIG. 3 illustrates the path of oil flow through oil purging device 10 when it used to remove contaminated oil from lubrication conduit 18. Oil purging device 10 is installed at any convenient location along lubrication conduit 18 but preferably as close to tank 26 as possible to maximize the purging of contaminated oil.

Figure 5:
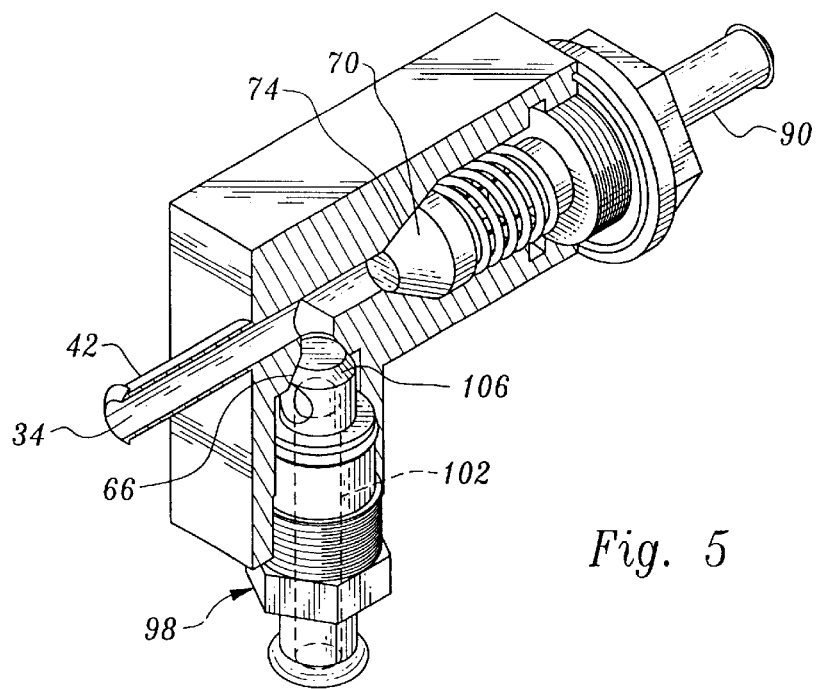
FIG. 5 shows a cross-sectional view of a preferred embodiment of the present invention, illustrating its internal components.
Figure 4:
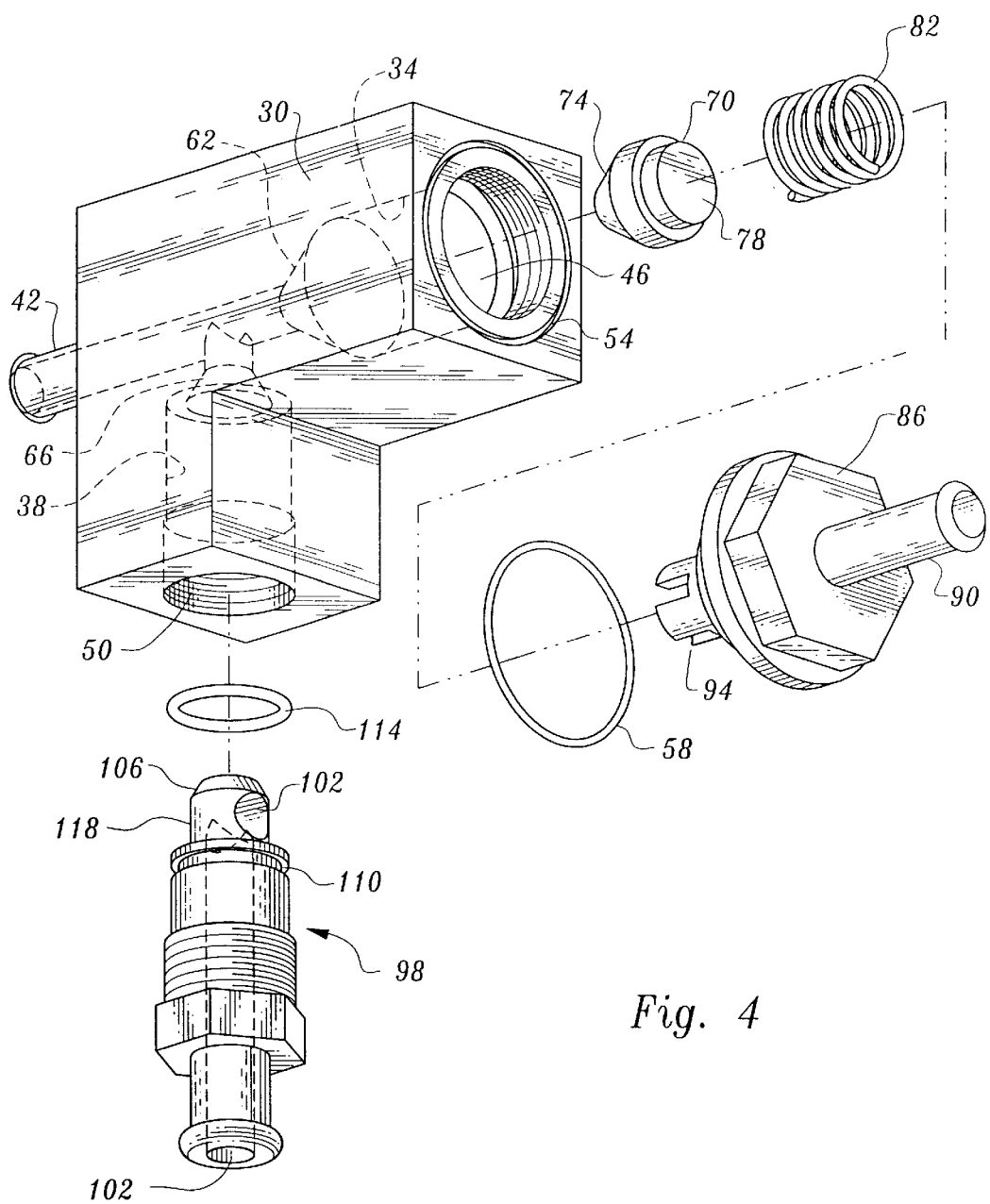
FIG. 4 is an exploded view of a preferred embodiment of the present invention, illustrating its internal components.
Figure 8:
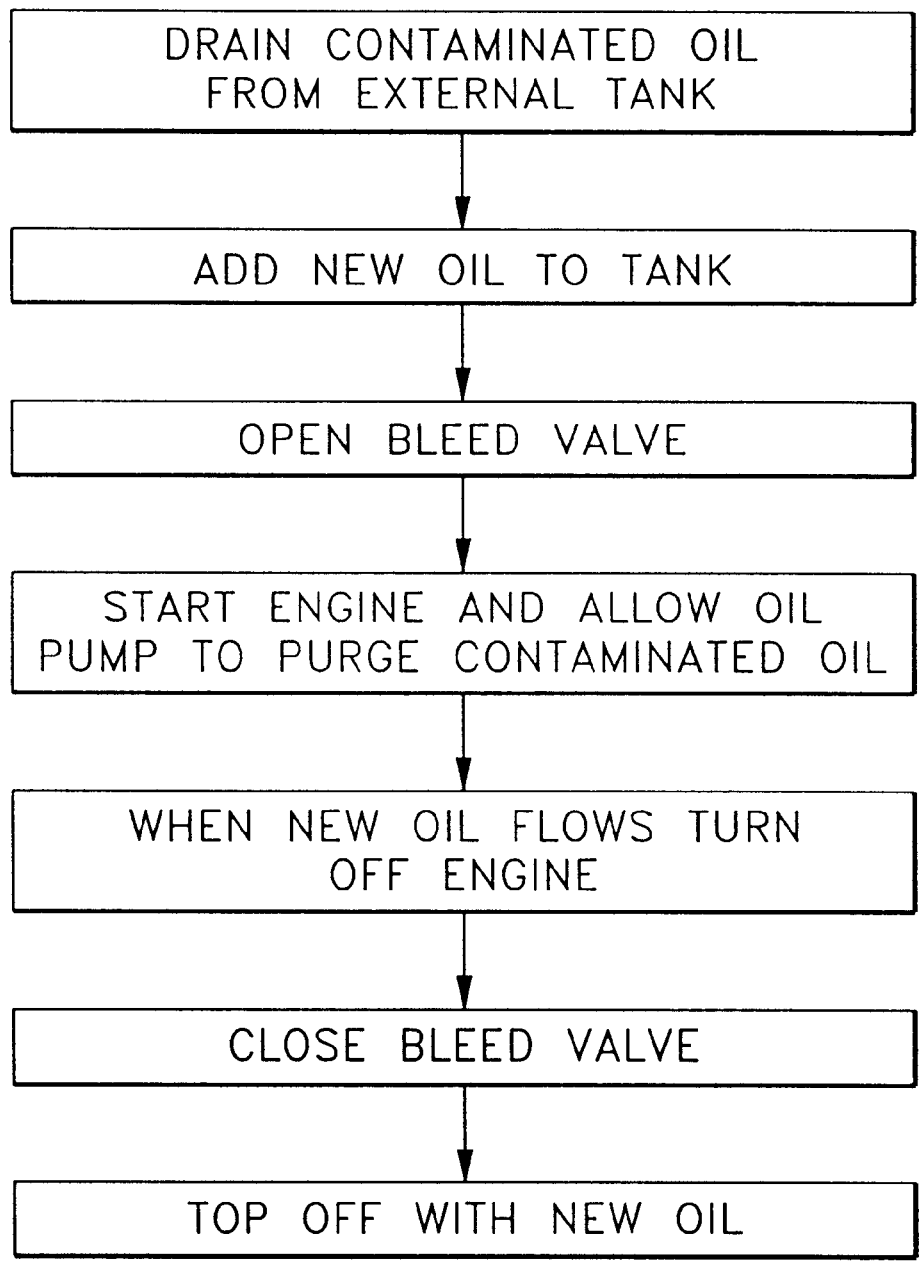

Turning now to FIGS. 1, 4 and 5, oil purging device 10 includes a housing 30. The external surface of housing 30 may optionally be finned (not shown) so as to increase the surface area of the housing. Such a configuration provides the benefit of increased heat dissipation from the engine oil as it passes through housing 30. Housing 30 is further provided with a primary bore 34 and a secondary bore 38. Housing 30 is provided with an inlet tube 42 in communication with primary bore 34 and secondary bore 38.

As is more clearly seen in FIGS. 4 and 5, housing 30 further includes a primary outlet 46 and a secondary outlet 50 relative to primary bore 34 and secondary bore 38. Housing 30 is preferably internally threaded at primary outlet 46 and secondary outlet 50 for the receiving of a fitting as will be discussed.

The periphery of primary outlet 46 includes an annular groove 54 on the surface of housing 30 for the receiving of flexible washer 58.

Primary bore 34 includes a check valve seat 62. In like manner, secondary bore 38 includes a secondary valve seat 66.

A check valve 70 is slideably disposed within primary bore 34 so as to be received by check valve seat 62. Check valve 70 has a check valve face 74 and a boss 78 for the receiving of a spring 82.

Again referring to FIGS. 4 and 5, an outlet fitting 86 includes outlet tube 90 and furcated projection 94. Outlet fitting 86 is adapted so as to be received by primary outlet 46 preferably by external machine threads.

Furcated projection 94 and boss 78 slideably receive spring 82.

Upon assembly of outlet fitting 86 into primary outlet 46, spring 82 urges check valve 70 against check valve seat 62. This has the effect of sealing off fluid communication from inlet tube 42 to primary outlet 46 in the absence of oil pressure sufficient to overcome the force constant k exerted by spring 82 on check valve 70.

The selection of spring 82 is based on the diameter of boss 78 and diameter of furcated projection 94. The selection of the force constant k of spring 82 is also based on the relative distance of furcated projection 94 and check valve 70 as well as the idling pressure potential of the oil pump driving the oil through the system as those skilled in the mechanical arts are aware. It is to be particularly noted that a variety of check valve assemblies may be used such as a ball valve or flap valve so long as the necessary seat with the check valve seat is achieved.

Diverter valve 98 includes a diverter bore 102 and a diverter valve face 106. Diverter valve 98 is adapted so as to be threadable received within secondary outlet 50, by the use of external machine threads. Diverter valve 98 is further provided with a peripheral groove 110 so as to receive gland washer 114.

Diverter valve 98 is provided with a frusto-conical projection 118 which includes diverter valve face 106 so as to be received by secondary valve seat 66. When diverter valve 98 is partially received within secondary outlet 50, diverter bore 102 is in communication with secondary outlet 50. When diverter valve 98 is fully received within secondary outlet 50, diverter valve face 106 is tightly compressed against secondary valve seat 66 so as to prevent the flow of fluid through diverter valve 98.

External threads on diverter valve 98 allow a user to selectively open or close diverter valve 98. Peripheral groove 110 and gland washer 114 serve to minimize oil flow between diverter valve 98 and secondary bore 38 when diverter valve 98 is open.

Turning now to FIGS. 5 and 6, during normal engine operation, diverter valve 98 is biased inward so as to tightly fit diverter valve face 106 of frusto-conical projection 118 against secondary valve seat 66, forming a seal and preventing the flow of fluid into diverter bore 102. Rather, pressurized oil enters inlet tube 42 and into primary bore 34, urging check valve 70 against the force of spring 82 so as to allow the passage of oil between check valve face 74 and check valve seat 62. Pressurized oil continues past and through spring 82, into primary outlet 46, through outlet tube 90 and back into lubrication conduit 18.

The primary benefit of the device which is the subject of the invention arises when the oil in an engine is changed. At that time, the user turns off the engine and drains the oil from the tank or crankcase through a drain plug provided on the engine. The drain plug is replaced and fresh oil is added to the tank or crankcase.

Referring now to FIG. 6, during normal operation, diverter valve 98 is biased fully inward so as to avoid fluid communication between diverter bore 102 and primary bore 34. In this manner, oil is allowed to pass directly through primary bore 34.

As is illustrated in FIG. 7, diverter valve 98 may be selectively biased outwardly so as to allow fluid communication between diverter bore 102 and primary bore 34. This has the effect of providing a path for pressurized oil from primary bore 34 through diverter bore 102.

The procedure for use of the proposed invention is as follows. Diverter valve 98 is biased outwardly as reflected in FIG. 7. The user then starts the engine, which in turn pressurizes lubrication conduit 18. The pressurized, contaminated oil in lubrication conduit 18 follows the least restrictive path, i.e. is directed through diverter bore 102 and out of the engine through diverter valve 98.

The user monitors the flow of oil through diverter valve 98 so that when fresh oil begins to flow, diverter valve 98 is then rotated by the user so as to tightly urge diverter valve face 106 against secondary valve seat 66 whereby any flow through diverter valve 98 is avoided.

Finally, the user shuts of the engine, tops off the tank or crankcase with fresh oil and the entire lubrication conduit circuit is purged of any contaminated oil.

It can therefore be seen that the present disclosure provides an oil purging device for a fluid conduit system that allows the quick and efficient installation or removal of contaminated oil, which is both inexpensive and requires minimal maintenance. Moreover, having thus described the invention, it should also be apparent that numerous structural modifications and adaptations maybe resorted to without departing from the scope and fair meaning of the instant invention as set forth herein above and as described herein below by the claims.

With respect to the above description then, it is also to be realized that optimum dimensional relationships for the parts of the invention, to include variations in size, materials, shape, form, the function and manner of operation, assembly and use, are deemed readily apparent and obvious to those skilled in the mechanical arts. All equivalent relationships to those illustrated in the drawings and described in the specification are intended to be encompassed by the present invention.

Therefore, the foregoing is considered illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of invention.

What is claimed is:

1. A device for purging fluid from a source, comprising;
   a. a housing having a primary bore and a secondary bore, said primary bore terminating in a first outlet, said secondary bore terminating in a second outlet, and an inlet communicating with said first and second outlets;
   b. control means for selectively diverting the flow of fluid between said first and second outlets, said control means comprising a check valve seat located in said primary bore, a check valve face received by said check valve seat, and spring means exerting a spring force of a certain valve to urge said valve face into reception by said valve seat to close said first bore to fluid flow until said spring force is overcome by a fluid force on said check valve face, said control means further comprising a diverter valve seat located in said secondary bore, a diverter valve face received by said diverter valve seat and means to vary the distance between said diverter valve face and said diverter valve seat to divert the flow of fluid through said inlet from said primary bore and first outlet, to said secondary bore and said second outlet.

2. The device of claim 1 in which said means for varying the distance between said diverter valve seat and said diverter valve face comprises a manually operated member.

3. The device of claim 2 in which said manually operated member includes a threaded portion on said member which threadingly engages a threaded portion on said secondary bore.

4. The device of claim 1 which further comprises a finned surface on said housing.

* * * * *